US010826280B2

(12) United States Patent
Matsuura (10) Patent No.: US 10,826,280 B2
(45) Date of Patent: Nov. 3, 2020

(54) ELECTRICAL CONNECTION BOX WITH DARK CURRENT CIRCUIT CONNECTION/DISCONNECTION STRUCTURE

(71) Applicant: SUMITOMO WIRING SYSTEMS, LTD., Mie (JP)

(72) Inventor: Daisuke Matsuura, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 144 days.

(21) Appl. No.: 16/314,557

(22) PCT Filed: Jun. 12, 2017

(86) PCT No.: PCT/JP2017/021639
§ 371 (c)(1),
(2) Date: Dec. 31, 2018

(87) PCT Pub. No.: WO2018/003472
PCT Pub. Date: Jan. 4, 2018

(65) Prior Publication Data
US 2019/0319434 A1 Oct. 17, 2019

(30) Foreign Application Priority Data

Jul. 1, 2016 (JP) .................................. 2016-131950

(51) Int. Cl.
*H02B 1/056* (2006.01)
*H02G 3/16* (2006.01)
(Continued)

(52) U.S. Cl.
CPC ......... *H02B 1/0565* (2013.01); *H01H 85/205* (2013.01); *H01H 85/2015* (2013.01);
(Continued)

(58) Field of Classification Search
CPC ............. H02B 1/0565; H01H 85/2015; H01H 85/205; H01H 2085/208; H02G 3/16; B60R 16/0238
(Continued)

(56) References Cited

U.S. PATENT DOCUMENTS 2,186,813 A * 1/1940 Adam .................... H01H 9/102
337/210
5,145,414 A * 9/1992 Oikawa .............. H01H 85/2035
439/374
(Continued)

FOREIGN PATENT DOCUMENTS

JP 07-169382 7/1995
JP 08-096697 4/1996
(Continued)

OTHER PUBLICATIONS

Official Communication issued in International Bureau of WIPO Patent Application No. PCT/JP2017/021639, dated Aug. 8, 2017.

*Primary Examiner* — Anatoly Vortman
(74) *Attorney, Agent, or Firm* — Greenblum & Bernstein, P.L.C.

(57) ABSTRACT

Provided is an electrical connection box that is equipped with a newly constructed dark current circuit connection/disconnection mechanism that can be used to change circuits of the dark current circuit connection/disconnection mechanism and improve versatility. A conduction member holder has a conduction member holding portion that extends spanning over a plurality of cavities that are provided in a case. A conduction member includes: a first conduction member that is connected to a connection terminal of a dark current circuit housed in one of the cavities; and a second conduction member that is connected simultaneously to the connection terminal of the dark current circuits housed in one of the cavities and a connection terminal of another (Continued)

circuit housed in another cavity. The first conduction member or the second conduction member that is selected according to a required circuit configuration is mounted in the conduction member holding portion.

2 Claims, 9 Drawing Sheets (51) Int. Cl.
    *H01H 85/20* (2006.01)
    *B60R 16/023* (2006.01)
(52) U.S. Cl.
    CPC ............ *H02G 3/16* (2013.01); *B60R 16/0238* (2013.01); *H01H 2085/208* (2013.01)
(58) Field of Classification Search
    USPC ........................................................ 361/652
    See application file for complete search history.

(56) References Cited

U.S. PATENT DOCUMENTS

| | | | | |
|---|---|---|---|---|
| 5,171,293 A * | 12/1992 | Umemoto | ............ | H01H 85/547 337/194 |
| 5,221,217 A * | 6/1993 | Oikawa | ............. | H01H 85/2035 439/374 |
| 5,277,626 A * | 1/1994 | Oikawa | ............. | H01H 85/2035 439/620.27 |
| 5,608,372 A * | 3/1997 | Yamaguchi | ........ | H01H 85/2045 337/190 |
| 5,632,654 A * | 5/1997 | Sugiura | ............. | H01H 85/2035 337/186 |
| 5,662,496 A * | 9/1997 | Kanamori | .......... | H01H 85/2035 337/186 |
| 5,751,208 A * | 5/1998 | Martinez | ............ | H01H 85/0208 337/194 |
| 5,816,858 A * | 10/1998 | Kazarian | ............ | H01H 85/2045 439/620.26 |
| 6,033,252 A * | 3/2000 | Hood | ................. | H01H 85/2035 439/374 |
| 6,585,541 B2 * | 7/2003 | Higashida | .......... | H01H 85/2045 337/186 |
| 6,875,028 B2 * | 4/2005 | Kita | .................... | H01R 13/6335 439/620.26 |
| 7,612,646 B2 * | 11/2009 | Kubota | .............. | H01H 85/2035 337/186 |
| 8,242,874 B2 * | 8/2012 | Pavlovic | ............ | H01H 85/153 337/187 |
| 8,338,704 B2 * | 12/2012 | Mizukami | ........... | B60R 16/0239 174/50 |
| 8,339,236 B2 * | 12/2012 | Okada | ................... | H02G 3/088 337/198 |
| 8,414,334 B2 * | 4/2013 | Nakayama | ........... | H01H 85/045 439/620.01 |
| 8,507,809 B2 * | 8/2013 | Nakayama | ........... | H01H 85/547 174/541 |
| 9,355,804 B2 * | 5/2016 | Nakamura | ........... | H01H 85/547 |
| 2002/0025700 A1 * | 2/2002 | Higashida | .............. | H01H 85/26 439/76.2 |
| 2013/0015941 A1 | 1/2013 | Nakamura et al. | | |
| 2019/0244774 A1 * | 8/2019 | Horiuchi | .................. | H02B 1/48 |

FOREIGN PATENT DOCUMENTS

| | | | |
|---|---|---|---|
| JP | 2011-188698 | 9/2011 | |
| JP | 2013-020849 | 1/2013 | |
| JP | 2018006213 A * | 1/2018 | |
| WO | WO-2014061298 A1 * | 4/2014 | ......... H01H 85/2035 |

* cited by examiner

ELECTRICAL CONNECTION BOX WITH DARK CURRENT CIRCUIT CONNECTION/DISCONNECTION STRUCTURE

TECHNICAL FIELD

The present invention relates to an electrical connection box of an automobile, and particularly relates to an electrical connection box including a dark current circuit connection/disconnection structure.

BACKGROUND ART

Conventionally, an electrical connection box such as a fuse box or a junction box that is installed in an automobile is sometimes provided with a dark current circuit connection/disconnection structure that makes it possible to disconnect a circuit (hereinafter referred to as a dark current circuit) that always consumes power, such as a clock, to prevent a battery from draining while operation is stopped for an extended period of time. For example, in JP H7-169382AP (Patent Document 1), a fuse holder that holds a dark current circuit fuse can be slidably moved in an insertion/removal direction with respect to a case that houses the dark current circuit, and can hold the dark current circuit fuse in such a way that it is possible to switch between a connection position in which the dark current circuit fuse is connected to the dark current circuit, and a disconnection position in which the dark current circuit fuse is disconnected from the dark current circuit.

Incidentally, in a dark current circuit connection/disconnection structure, in order to stably position and support a dark current circuit fuse in a fuse cavity that houses the dark current circuit fuse, a fuse holder is constructed to enclose the dark current circuit fuse, and furthermore, on the side of the case that is provided with the fuse cavity that houses the dark current circuit fuse, it is necessary to provide an insertion region in which a leg portion of the fuse holder is inserted and arranged, a holding mechanism for holding the leg portion in the disconnection position and the connection position, and the like. As a result, providing a dark current circuit connection/disconnection structure requires an extremely complicated mechanism and many members.

However, the need for a dark current circuit connection/disconnection structure is limited to specified periods such as a period in which a vehicle is transported before sale, and the dark current connection/disconnection structure continues to be used thereafter while still held in a state in which the dark current circuit fuse is connected. Hence, the period in which a dark current circuit connection/disconnection mechanism is effectively used is short, and the structure goes to waste.

CITATION LIST

Patent Documents

Patent Document 1: JP H7-169382A is an example of prior art.

SUMMARY OF INVENTION

Technical Problem

The present invention has been made based on the above circumstances and the problem to be solved is to provide an electrical connection box that includes a dark current circuit connection/disconnection mechanism with a new structure having improved versatility, according to which the dark current circuit connection/disconnection mechanism can also be used for circuit changing.

Solution to Problem

A first embodiment of the present invention is directed to an electrical connection box including a dark current circuit connection/disconnection structure, formed by attaching, to a case for housing a dark current circuit, a conduction member holder for holding a conduction member for conductively connecting the dark current circuit, such that the conduction member holder can move in an insertion and removal direction of the conduction member, the conductive member being held in such that it is possible to switch between a connection position of being conductively connected to a connection terminal of the dark current circuit housed in a cavity of the case and a disconnection position of being disconnected from the connection terminal, wherein, the conduction member holder has a conduction member holding portion that extends spanning over a plurality of said cavities provided in the case, the conduction member includes a first conduction member that is to be connected to the connection terminal of the dark current circuit that is housed in one of the cavities, and a second conduction member that is to be simultaneously connected to the connection terminal of the dark current circuit housed in one of the cavities and a connection terminal of another circuit that is housed in another one of the cavities, and the first conduction member or the second conduction member selected according to a required circuit configuration is mounted in the conduction member holding portion.

According to the present embodiment, it is possible to stably perform switching on and off the dark current circuit because the dark current circuit connection/disconnection structure is included. Furthermore, the conduction member holder has a conduction member holding portion that extends spanning over the plurality of cavities that are provided in the case, and thus it is possible to selectively connect, to the conduction member holding member, one of a first conduction member that conductively connects only with the connection terminal of the dark current circuit, and a second conduction member that is simultaneously connected to the connection terminal of the dark current circuit and a connection terminal of another circuit. Through this, the dark current circuit connection/disconnection structure can be used not only for switching on and off the dark current circuit, but also for changing the circuit configuration by the dark current circuit conductively connecting with another circuit. As a result, it is possible to apply the electrical connection box including the dark current circuit connection/disconnection structure to a type of vehicle with different circuit configurations, and it is also possible to use the dark current circuit connection/disconnection structure to improve the versatility of the electrical connection box.

Note that if the first and second conduction members can achieve conduction of the dark current circuit and conduction of the dark current circuit and another circuit, then any structure can be employed, and the first and second conduction members may also be constituted by fuses that have fusion cutting portion and pairs of tab terminals, short pins that do not have fusion cutting portions, and bus bars that have tab portions that can perform conduction with connection terminals by being inserted into the cavities.

The electrical connection box including a dark current circuit connection/disconnection structure as described above, wherein, a power source is input from a battery to the dark current circuit, but if another power source is to be input to the other circuit, the first conduction member is selected, and the second conduction member is selected if the power source is not to be input to the other circuit.

According to the present embodiment, it is possible to use the same electrical connection box in vehicles that have different power input systems by appropriately selecting the first conduction member and the second conduction member, and it is possible to improve the versatility of the electrical connection box by using the existing dark current circuit connection/disconnection structure.

Advantageous Effects of Invention

According to the present invention, it is possible to stably perform switching on and off of the dark current circuit because a dark current circuit connection/disconnection structure is included. Furthermore, the conduction member holder has a conduction member holding portion that extends spanning over the plurality of cavities that are provided in the case, and it is possible to selectively connect, to the conduction member holding portion, one of a first conduction member that conductively connects only with the connection terminal of the dark current circuit, and a second conduction member that is simultaneously connected to the connection terminal of the dark current circuit and a connection terminal of another circuit. Therefore, the dark current circuit connection/disconnection structure can be used not only be used for switching on and off the dark current circuit, but can also be used for changing the circuit configuration due to the dark current circuit conductively connecting with another circuit. As a result, it is possible to apply an electrical connection box including a dark current circuit connection/disconnection structure to a type of vehicle with a different circuit configuration, and to improve the versatility of the electrical connection box.

DESCRIPTION OF EMBODIMENTS

The following describes embodiments of the present invention with reference to the drawings.

First, FIGS. 1 to 9 show an electrical connection box 10 including a dark current circuit connection/disconnection structure according to an embodiment of the present invention. The electrical connection box 10 is constituted by including a case 14 that houses the dark current circuits 12 (see FIG. 3), and a conduction member holder 18 that holds a conduction member 16 (see FIG. 5) that conductively connects the dark current circuits 12. In the case 14, bus bars 30 and wires (not shown) which constitute an internal circuit that includes the dark current circuits 12, are housed and arranged, whereas an upper case and a lower case (neither of which are shown) are overlaid and attached from both sides in the up-down direction of the case 14. Note that in the following description, the upward direction is the upward direction in FIG. 2, the downward direction is the downward direction in FIG. 2, the forward direction is the downward direction in FIG. 1, the backward direction is the upward direction in FIG. 1, the lengthwise direction is up-down direction in FIG. 1, and the widthwise direction is the left-right direction in FIG. 1.

Figure 1:
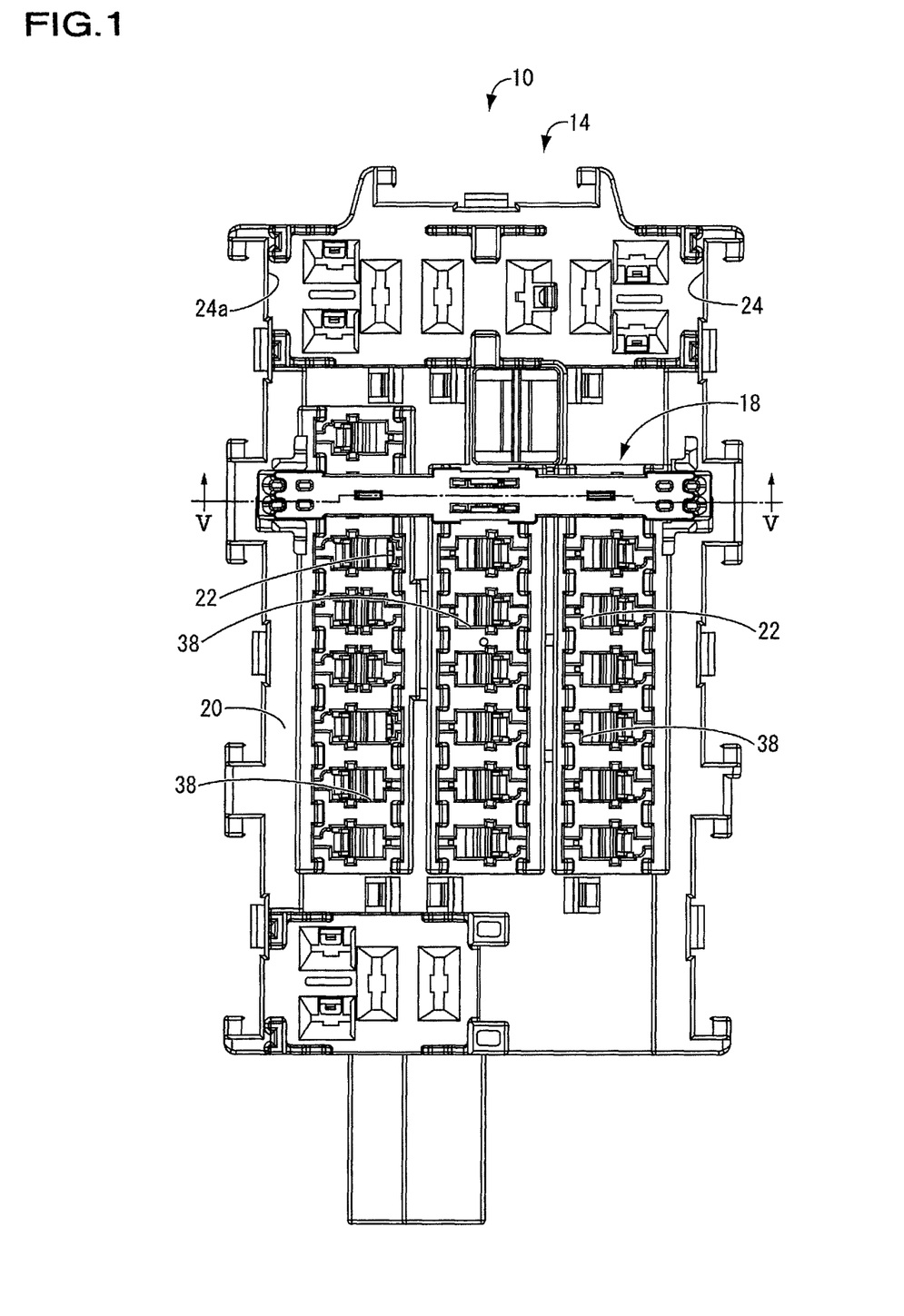
FIG. 1 is an overall plan view showing an electrical connection box including a dark current circuit connection/disconnection structure serving as an embodiment of the present invention.
Figure 2:
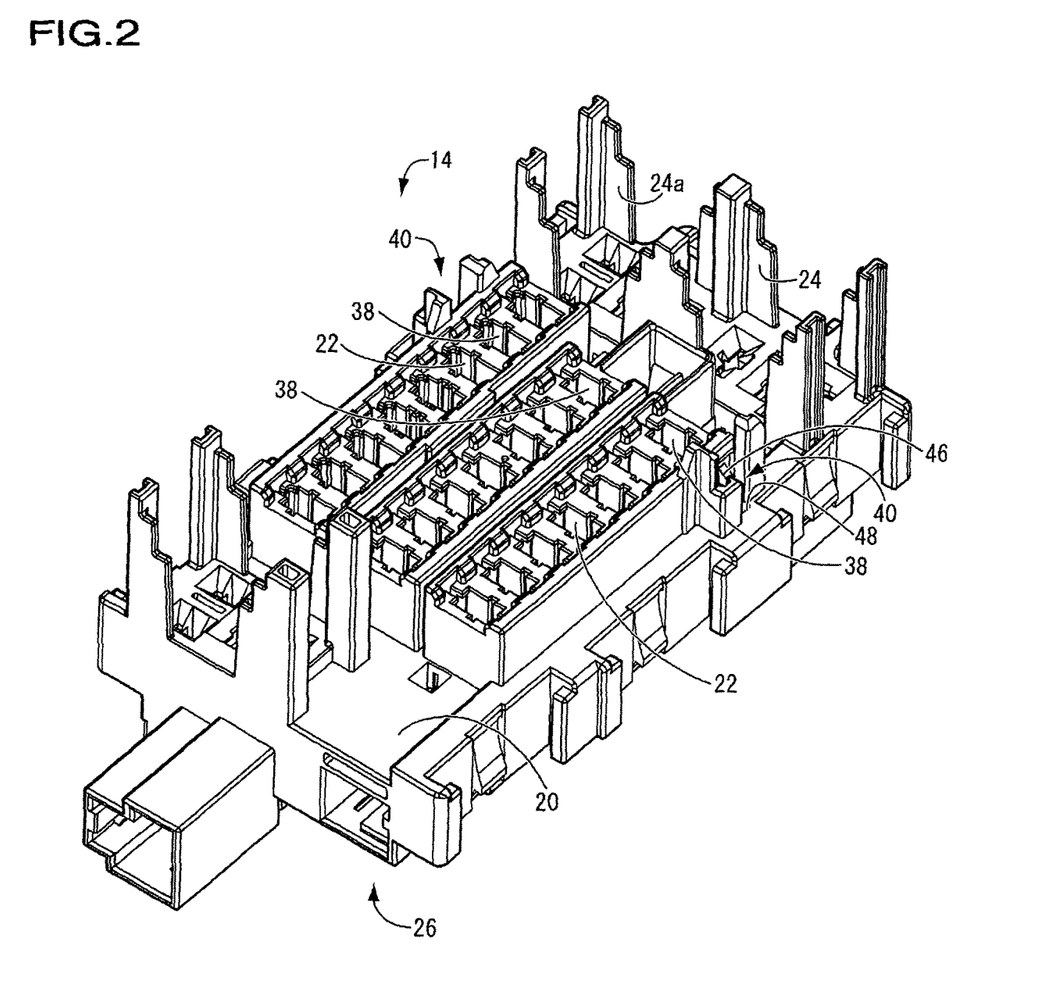
FIG. 2 is a perspective view of the case shown in FIG. 1.
Figure 3:
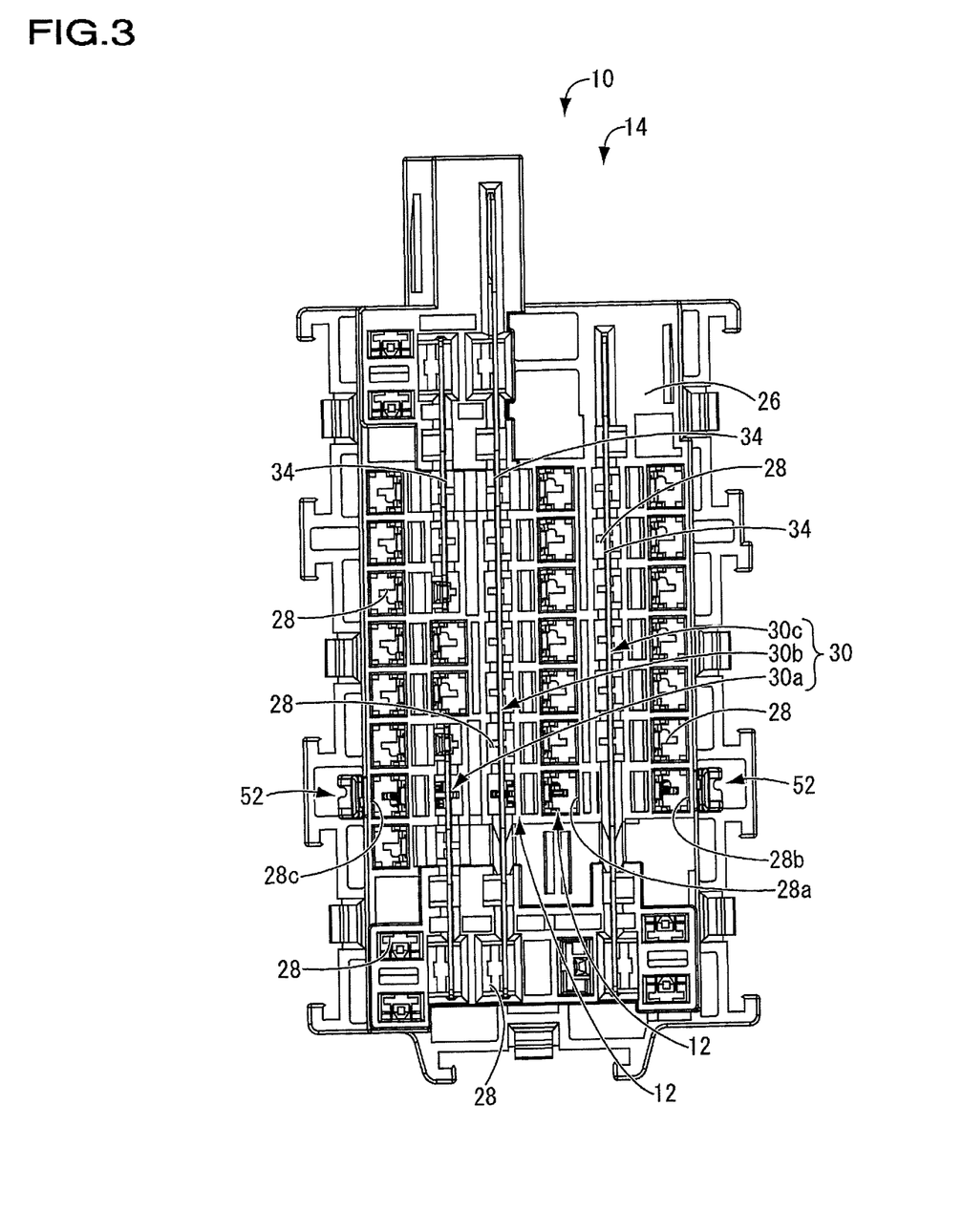
FIG. 3 is a bottom view of FIG. 1.
Figure 4:
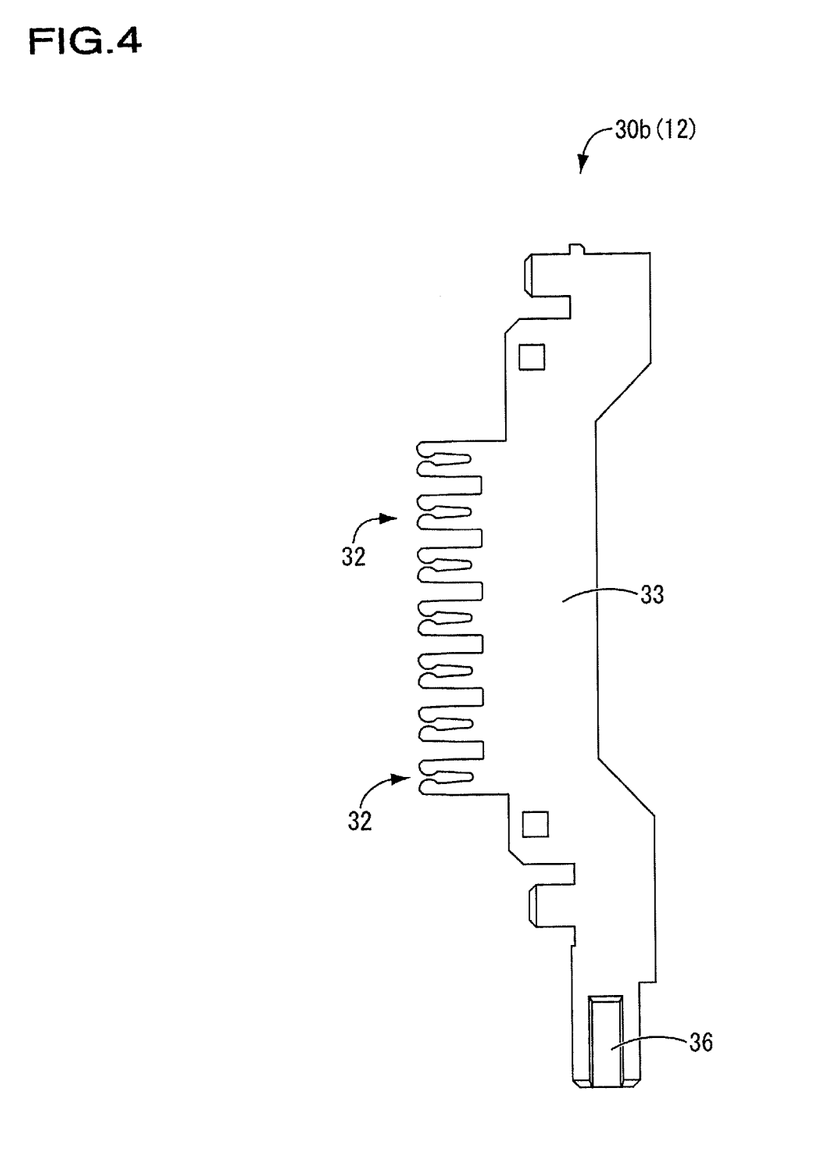
FIG. 4 is a right side view showing an example of the bus bar of FIG. 3.

As shown in FIGS. 1 to 3, the case 14 has a longitudinal rectangular block shape overall, and is formed as a single body through injection molding or the like using an insulating synthetic resin, for example, polypropylene (PP) or polyamide (PA). On an upper surface 20 of the case 14, a plurality of fuse mounting portions 22 and a relay mounting portion 24 are formed open facing upward. On the bottom surface of the fuse mounting portions 22 and the relay mounting portion 24, terminal insertion holes 28 that are open to a lower surface 26 side of the case 14 are provided penetrating therethrough (see FIG. 3 and FIG. 4), and connection terminals 32 (see FIG. 4 and FIG. 5) that are provided on bus bars 30, and connection terminals (not shown) that are crimped to wire ends, are inserted and arranged therein. By mounting fuses and a relay (not shown) to the fuse mounting portions 22 and the relay mounting portion 24 from the upper surface 20 side of the case 14, the tab terminals that protrude from the fuses and the relay are connected to the connection terminal, and the bus bars 30 and wires that constitute the internal circuit are brought into conduction. Also, the lower surface 26 side of the case 14 is provided with bus bar mounting grooves 34 that extend spanning between the plurality of terminal insertion holes 28 (see FIG. 3).

Via the bus bar mounting grooves 34 from the lower surface 26 side of the case 14, the bus bars 30a, 30b and 30c that are included in the internal circuit are each inserted into the bus bar mounting grooves 34 and are arranged and held in the terminal insertion holes 28. More specifically, all of the bus bars 30a, 30b and 30c are plates formed through punching a conductive metal plate, and, similar to the bus bar 30 shown as an example in FIG. 4, the bus bars have a structure in which a plurality of connection terminals 32 that are composed of tuning fork terminals are provided in a protruding manner on the leading end portions thereof, whereas power source input terminals 36 that extend outward in the lengthwise direction are provided on end portions in the lengthwise direction of the bus bars. Through this, the connection terminals 32 are mounted in the fuse mounting portions 22 and the relay mounting portion 24, at which upper ends of the terminal insertion holes 28 are open, whereas base end portions 33 that support the connection terminals 32 are arranged to be held by the bus bar mounting grooves 34, at which the lower end sides of the terminal insertion holes 28 are open. Here, of the bus bars 30, power from a battery (not shown) is input to the bus bar 30*b* via a power source input terminal 36, whereas power from the battery is input to the bus bar 30*a* via a relay (not shown) that is mounted to the relay mounting portion 24*a* from the bus bar 30*b*. Also, power is input from the battery (not shown) via a power input terminal (not shown) to the bus bar 30*c*.

Figure 5:
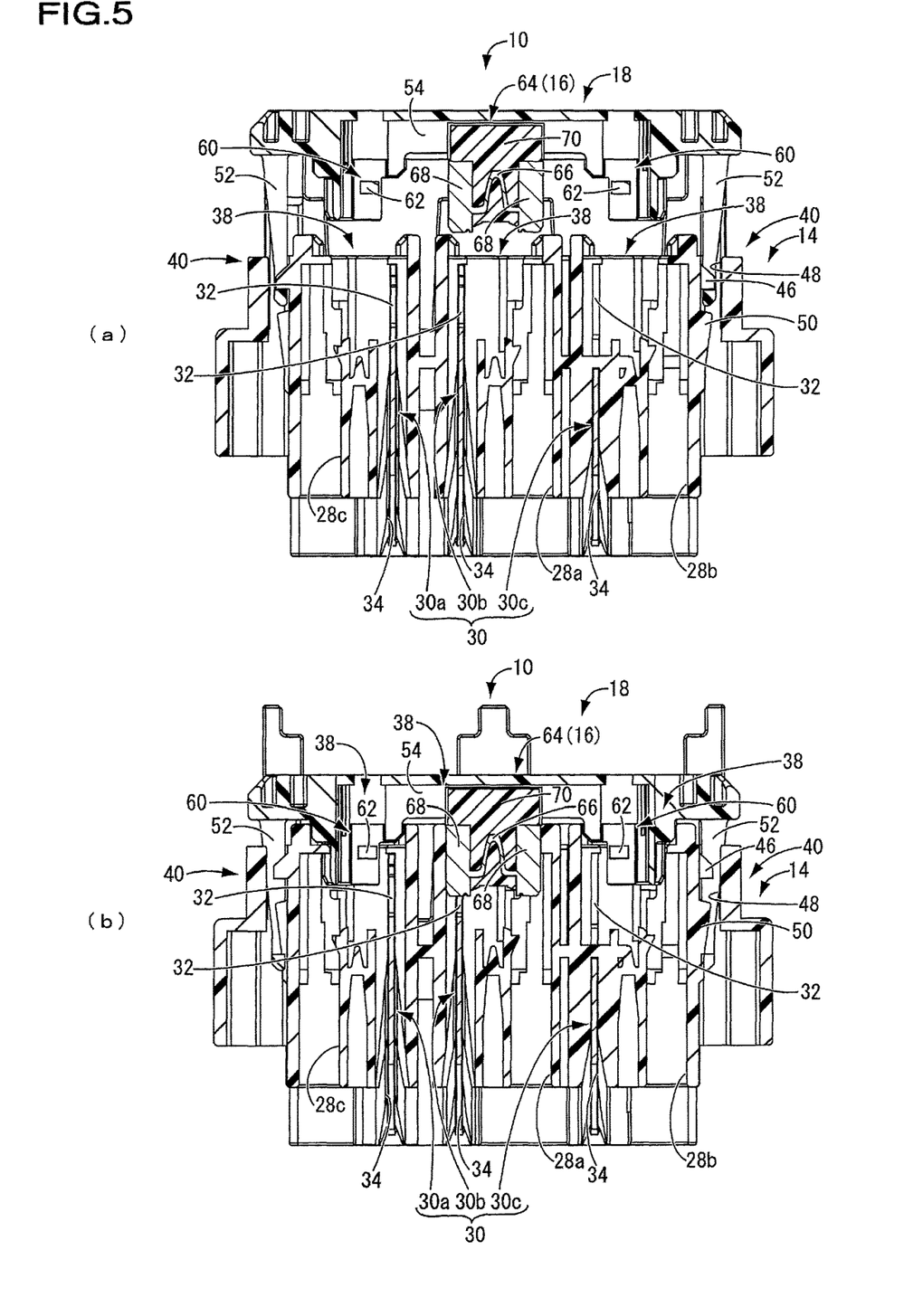
FIG. 5 is an enlarged cross-section taken along line V-V of FIG. 1 ((a) disconnection position, (b) connection position).

As shown in FIG. 2 and FIG. 5, in the case 14 configured in this way, cavities 38 that house the conduction members 16 are constituted by the fuse mounting portions 22 that are open upward. More specifically, three cavities 38 are arranged such that they are aligned in a straight line in the width direction. Furthermore, holding portions 40 that hold the conduction member holder 18 in the disconnection position and connection position, both of which will be described later, are provided on both side edge portions in the width direction of the three cavities 38 that are arranged to be aligned in a straight line. Here, first locking portions 46 are formed on the leading end sides of the holding portions 40 by protruding portions that protrude outwards in shapes with roughly triangular cross-sections in a front view, whereas through holes 48 that penetrate in the up-down direction and have roughly rectangular shapes in a plan view are provided on the base end sides of the holding portions 40, and second locking portions 50 are formed by parts of the inner surfaces inside of the through holes 48 outwardly protruding in shapes with roughly triangular cross-sections in a plan view.

Figure 6:
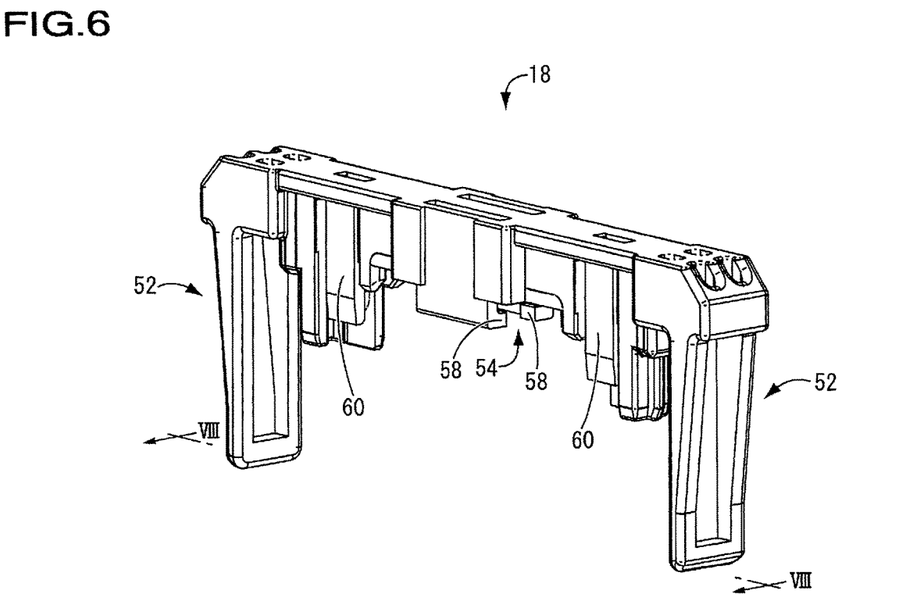
FIG. 6 is a perspective view of a conduction member holder shown in FIG. 1.
Figure 7:
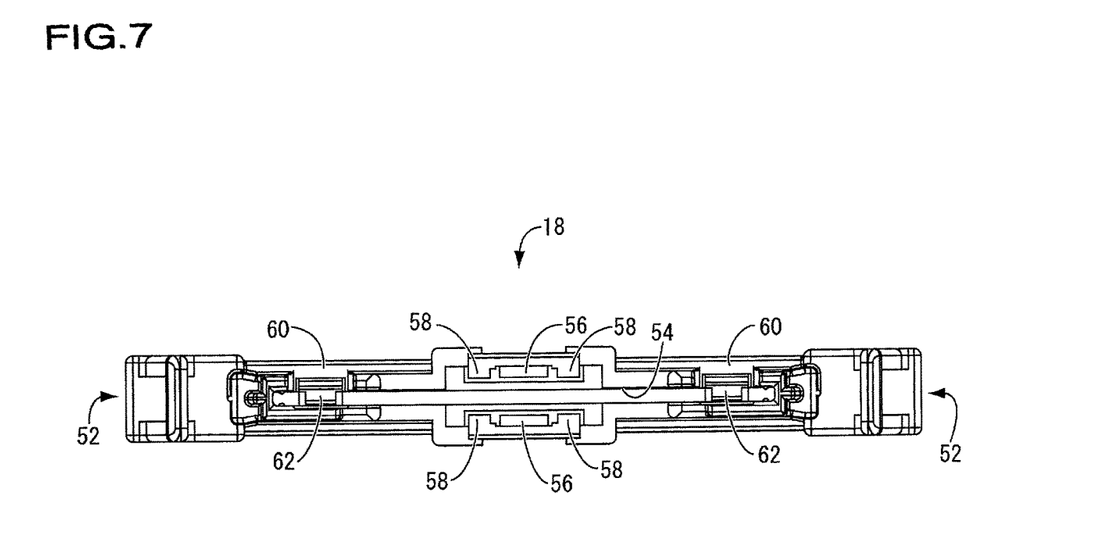
FIG. 7 is a bottom view of FIG. 6.
Figure 8:
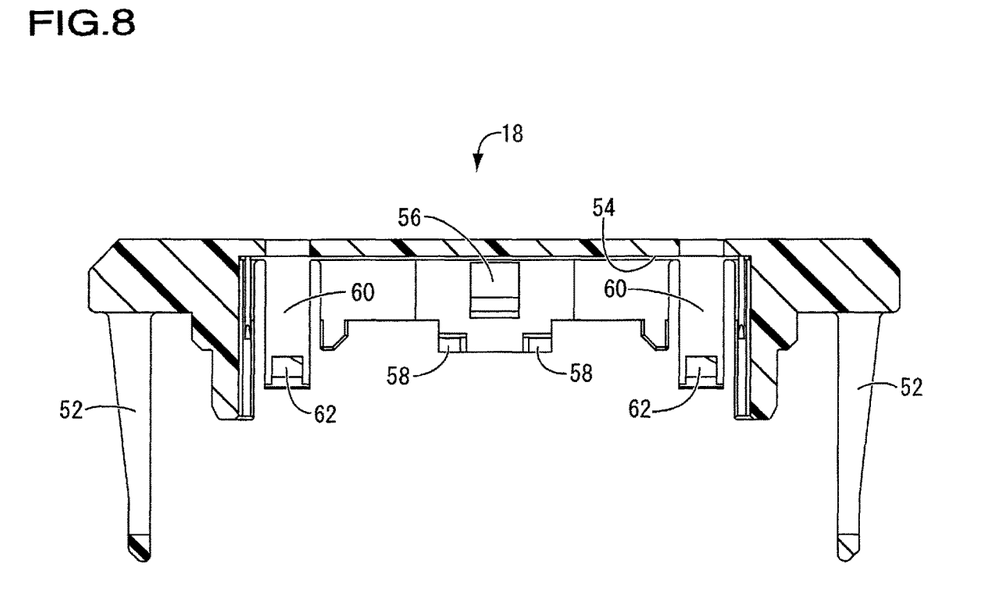
FIG. 8 is a sectional view taken along line VIII-VIII of FIG. 6.

In the present embodiment, as shown in FIG. 1 and FIG. 5, the conduction member holder 18 in which the conduction member 16 is mounted is used while attached to the case 14 configured in this manner. The conduction member holder 18, as shown in FIGS. 6 to 8, is roughly shaped like the letter "U" turned upside-down in a plan view, and is formed as a single body through injection molding using, for example, an insulating synthetic resin such as polypropylene (PP) or polyamide (PA). More specifically, roughly frame-shaped locking arms 52 that protrude vertically downward are provided on both side end portions in the lengthwise direction of the conduction member holder 18, whereas, as shown in FIG. 7, a roughly groove-shaped conduction member holding portion 54 that opens downwards and extends in the lengthwise direction is formed on the lower surface of the conduction member holder. As shown in FIGS. 7 and 8, the central portion of the conduction member holding portion 54 in the lengthwise direction has holding ribs 56, which are approximately rectangular shaped in a plan view, and protrude facing inward from inner surfaces on the upper side that oppose each other in the front-rear direction (the up-down direction in FIG. 7), and a pair of holding protrusions 58 and 58, which are approximately rectangular shaped in a plan view and protrude facing inward from inner surfaces on both sides of the lower end portion that oppose each other in the front-rear direction. Also, on both end portions of the conduction member holding portion 54 in the lengthwise direction, elastic bending parts 60 that are approximately thin-rectangle shaped in a plan view and protrude vertically downward from the top wall of the conduction member holder 18 are formed on the frontward side of the lower surface, and engagement protrusions 62 are provided protruding inward on protruding end portions of the elastic locking parts 60.

Figure 9:
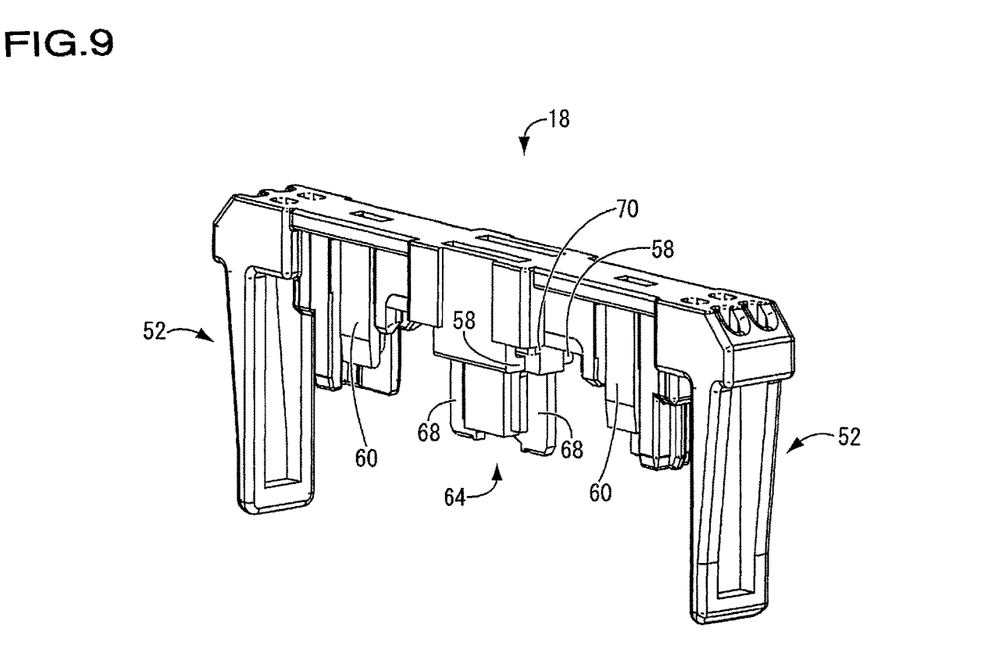
FIG. 9 is a perspective view showing a state in which a first conduction member is attached to the conduction member holder shown in FIG. 6.

The conduction member 16 is mounted from the lower side in the conduction member holder 18 that is formed in this way. Here, the conduction member 16 is formed to include a first conduction member and a second conduction member. First, the following describes a case in which the first conduction member is mounted in the conduction member holder 18 and used. In the present embodiment, as shown in FIG. 9, the first conduction member is constituted by a fuse 64. More specifically, as shown in FIG. 5, the fuse 64 is constituted by a pair of tab terminals 68 and 68 that are approximately plank shaped, are linked via a fusion cutting portion 66, and have a structure in which the fusion cutting portion, the region adjacent to the fusion cutting portion 66, and the upper end portions are molded using an insulating synthetic resin. Through this, the fuse 64 is constituted by a fusion cutting portion 66 that is covered by a synthetic resin, a head portion 70 that is constituted by a thick synthetic resin, and a pair of tab terminals 68 and 68 that protrude downward and outward from both edge portions in the widthwise direction of the synthetic resin that covers the fusion cutting portion 66. Then, the fuse 64 is housed and held in the conduction member holding portion 54 of the conduction member holder 18 from below. More specifically, the head portion 70 of the fuse 64 is held in a state of being sandwiched between the pair of holding protrusions 58 and 58 that oppose each other and are provided on an inner surface on both sides of the lower end portion in a central portion in the lengthwise direction of the conduction member holding portion 54.

Next, as shown in FIG. 1 and FIG. 5, the conduction member holder 18 in which the fuse 64 that is the first conduction member is thus mounted, is attached so as to be able to move in the insertion/removal direction of the fuse 64 (the up-down direction in FIG. 5) to the case 14 that houses the dark current circuits 12. More specifically, the fuse 64 can be held in the case 14 so as to be able to switch between the connection position for conductively connecting the dark current circuits 12 the disconnection position for disconnecting the dark current circuits 12. That is, in the connection position (see FIG. 5(*b*)), by mounting the fuse 64 to the center cavity 38 of the three cavities 38 that are arranged aligned in a straight line in the widthwise direction of the case 14, one of the pair of tab terminals 68 of the fuse 64 is made to be conductive by being sandwiched between the tuning fork shaped connection terminals 32 of the bus bar 30*b* that receives input of power from a battery (not shown), whereas a connection terminal that is crimped to a wire end (not shown) that is arranged in the terminal insertion hole 28*a* (not shown) is connected to the other tab terminal 68 to put the dark current circuits 12 in a connected state. Through this, the fuse 64, which is the first conduction member, is connected to the connection terminal that is arranged in the terminal insertion hole 28*a* that is included in the dark current circuits 12, the dark current circuits 12 is put in a connected state, and power is input thereto from the battery (not shown). Note that, in the connection position, the conduction member holder 18 in which the fuse 64 is mounted can be stably held in the case 14 due to the leading end portions of the locking arms 52 provided on both side end portions in the lengthwise direction being inserted into the through holes 48 provided penetrating through both used edge portions of the three cavities 38 aligned in a straight line in the widthwise direction of the case 14, and being fit into the second locking portions 50 provided in the through holes 48 (see FIG. 5(b)).

On the other hand, in the disconnection position (see FIG. 5(a)), due to the fuse 64, which is the first conduction member, being arranged at a position that is separated upward from the cavity 38, the connection between the connection terminal 32 of the bus bar 30b that receives input of power from the battery (not shown) and the connection terminal (not shown) that is arranged in the terminal insertion hole 28a is in a disconnected state. Through this, the dark current circuits 12 can be put in a state of disconnection in which power is not supplied from the battery to the dark current circuits 12. Note that, in the disconnection position, the conduction member holder 18 in which the fuse 64 is mounted can stably hold the case 14 due to the leading end portions of the locking arms 52 provided on both side end portions in the lengthwise direction being inserted into the through holes 48 provided penetrating through both side edge portions of the three cavities 38 aligned in a straight line in the widthwise direction of the case 14, and being fit into the second locking portions 50 provided in the through holes 48 (see FIG. 5(b)).

Figure 10:
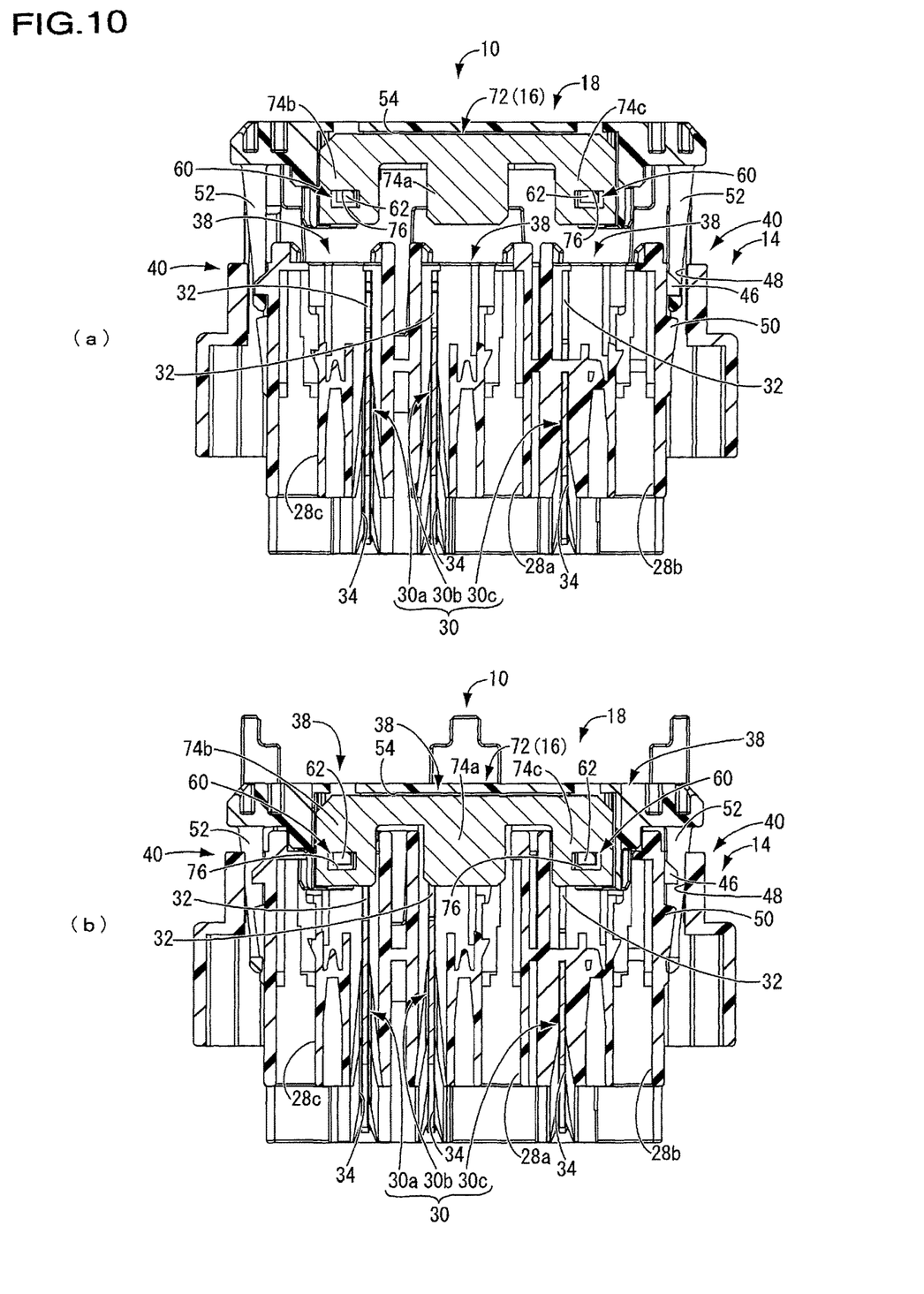
FIG. 10 is a sectional view showing a state in which a second conduction member is attached to the conduction member holder of the present embodiment, and corresponds to FIG. 5.

Next, the following describes a case in which the second conduction member holder is mounted in the conduction member holder 18 and used. As shown in FIG. 1 and FIG. 5, the conduction member holder 18 has the conduction member holding portion 54 that extends spanning over the three cavities 38 that are aligned in a straight line in the widthwise direction of the case 14 and therefore, for example, by employing a bus bar 72 (see FIG. 10) that has a length that is approximately equal to the extending length of the conduction member holding portion 54 as the second conduction member, a configuration is possible in which the bus bars 30a, 30b, and 30c, which are respectively housed in the three cavities 38, are all made conductive, and the connection terminals that are crimped to the wire ends (not shown) arranged in the terminal insertion holes 28b and 28c are simultaneously put in a conductive state. More specifically, the bus bar 72 is a plate formed by punching an electrically conductive metal plate, and as shown in FIG. 10, has an approximately horizontally long rectangular plate shape overall, and the center portion and both end portions in the lengthwise direction are provided with three tab terminals 74a, 74b and 74c that protrude downward in an approximately rectangular plate shape. Of the tabs 74a to 74c, the tab terminals 74b and 74c that are arranged on both end portions in the lengthwise direction have engagement holes 76 that penetrate through the center portions in the plate thickness direction, and by engaging with the engagement protrusions 62 that are formed on the elastic bending parts 60 arranged on the conduction member holder 18, the bus bar 72 is stably held in the conduction member holding portion 54.

That is to say, by employing the bus bar 72 as the second conduction member, in addition to the connection terminals 32 of the bus bars 30a, 30b and 30c, it is possible to simultaneously connect to the connection terminals that are crimped to the wire ends included in another circuit that is housed in the terminal insertion holes 28b and 28c and the connection terminal that is crimped to the wire ends (not shown) that is included in the dark current circuit 12 that is housed in the terminal insertion hole 28 of one of the cavities 38 that is located in the center portion. In this way, if the bus bar 72 is employed as the second conduction member, the power source from the battery (not shown) that is input to the power source input terminal 36 of the bus bar 30b is supplied also to the bus bar 30a and 30c via the bus bar 72. In this way, if the bus bar 72 is employed as the second conduction member, it is possible to apply the same electrical connection box 10 also to relays for supplying power from a battery to the bus bar 30a and vehicles that have different power source input systems in which power from a separate battery is not supplied to the bus bar 30c.

Put simply, in a case where power is supplied from the battery (not shown) to the dark current circuits 12 via the bus bar 30b and another power source is supplied to the bus bar 30c that is included in another circuit, the fuse 64 that is the first conduction member is selected. Also, if power is not supplied from another power source to the bus bar 30c, the bus bar 72 that is the second conduction member is selected. In this way, by mounting the fuse 64 that is the first conduction member or the bus bar 72 that is the second conduction member, which are selected according to the required circuit configuration, in the conduction member holding portion 54 of the conduction member holder 18, connection/disconnection of the dark current circuits 12, as well as the switching of the circuit configurations can be performed.

Note that, also in a case where the bus bar 72 that is the second conduction member is mounted in the conduction member holder 18 and used, similar to the case where the fuse 64 that is the first conduction member is mounted and used, the conduction member holder 18 can be held in the case 14 in such a way that the connection position and the disconnection position can be switched between.

According to the electrical connection box 10 including the dark current circuit connection/disconnection structure according to the present embodiment, the conduction member holder 18 in which the fuse 64 that is the first conduction member, or the bus bar 72 that is the second conduction member is mounted, can be held in the case 14 in such a way that it is possible to switch between a connection position of conductively connecting the dark current circuits 12 and the disconnection position of disconnecting the dark current circuits 12. Therefore, it is possible to stably perform switching on and off the dark current circuits 12. Also, because the conduction member holder 18 has a conduction member holding portion 54 that extends spanning over the plurality of cavities 38 that are aligned in a straight line in the widthwise direction of the case 14, it is possible to selectively connect, to the conduction member holding portion 54, either the fuse 64 that is the first conduction member and conductively connects only with the connection terminals that are arranged in the terminal insertion holes 28 that constitute the dark current circuits 12, or the bus bar 72 that is the second conduction member and is simultaneously connected to the bus bars 30a and 30c that are included in another circuit of the dark current circuits 12. Therefore, according to the present embodiment, the present invention can be used not only for switching on and off the dark current circuit 12, but also for changing the circuit configuration by conductively connecting the dark current circuits 12 and another circuit. Accordingly, it is possible to apply the electrical connection box 10 including the dark current circuit connection/disconnection structure to a type of vehicle with different circuit configurations, and therefore it is also possible to improve the versatility of the electrical connection box.

In the present embodiment, it is possible to only disconnect the dark current circuits 12 when the fuse 64, which is the first conduction member, is selected, whereas the power from the battery that is supplied by the bus bar 30b to another circuit that is housed in the case 14 can be supplied to the bus bars 30*a* and 30*c* via the bus bar 72, which is the second conduction member, if the bus bar 72, which is the second conduction member, is selected. Thus, by appropriately selecting the first conduction member and the second conduction member, it is possible to use the same electrical connection box 10 in vehicles that have different power input systems, and therefore it is possible to improve the versatility of the electrical connection box 10 by using the existing dark current circuit connection/disconnection structure.

Figure 11:
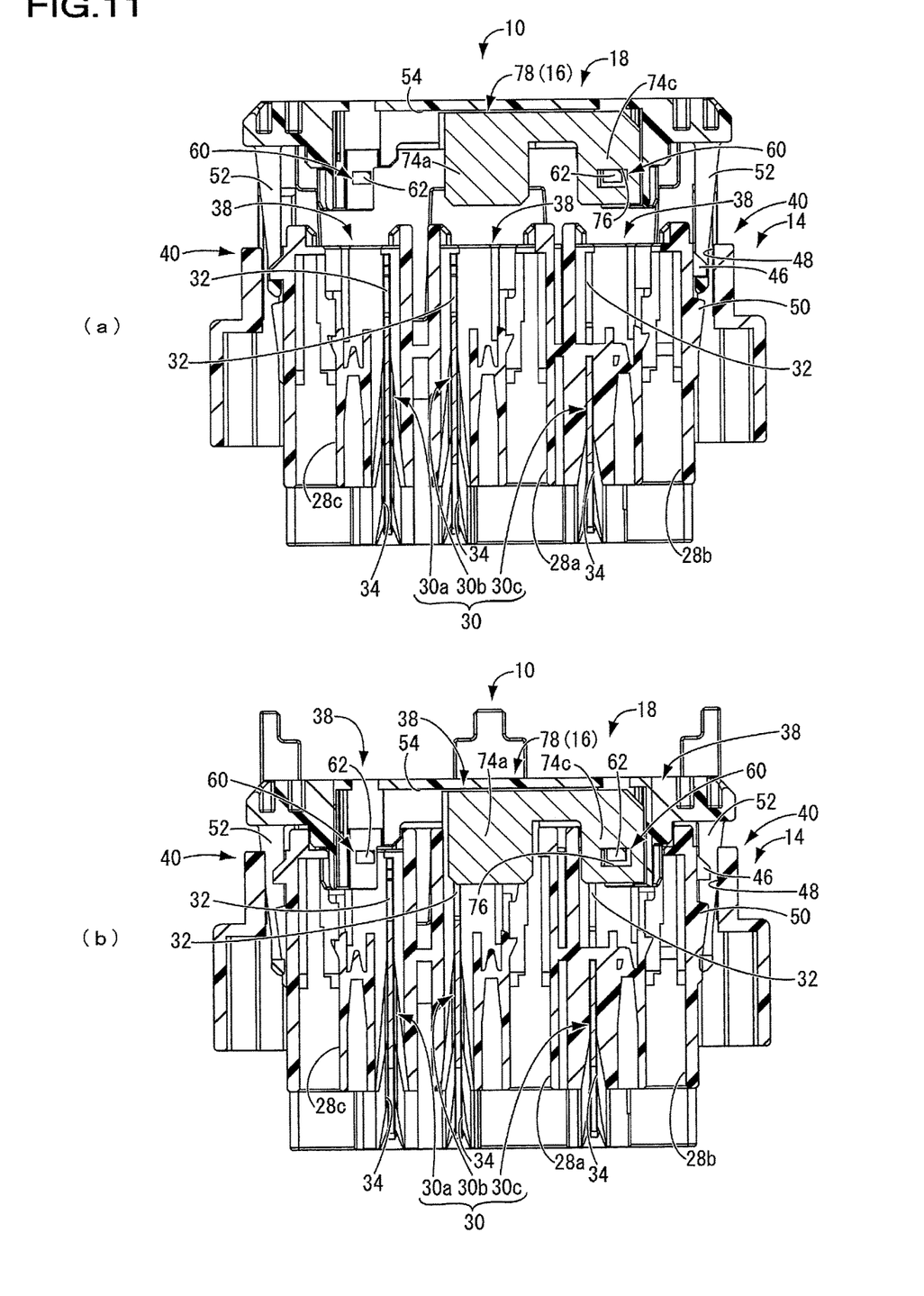
FIG. 11 is a sectional view showing another state in which the second conduction member is attached to the conduction member holder of the present embodiment, and corresponds to FIG. 10.

The above describes an embodiment of the present invention, but the present invention is not limited by this specific description. For example, in the present embodiment, three tab terminals 74*a*, 74*b* and 74*c* are formed on the bus bar 72, which is the second conduction member, and are inserted in the three cavities 38, but as shown in FIG. 11, a configuration may also be employed in which two tab terminals 74*a* and 74*c* are provided in the bus bar 78, which is the second conduction member. In this case as well, not only the dark current circuits 12, but other circuits are supplied with power from the battery. That is to say, power is supplied from the battery to one other circuit via the bus bar 78, whereas power is supplied from the battery to another other circuit via a relay.

Note that, if the first and second conduction members are able to achieve conductive connectivity with the dark current circuits 12 and conductive connectivity between the dark current circuits 12 and another circuit, the fuse 64 and the bus bar 72 and 78 as described in the embodiments above are not particularly limited, and any structure may be employed, such as a short pin that does not have the fusion cutting portion 66.

LIST OF REFERENCE NUMERALS

- 10: Electrical connection box
- 12: Dark current circuit
- 14: Case
- 16: Conduction member
- 18: Conduction member holder
- 32: Connection terminal
- 38: Cavity
- 54: Conduction member holding portion
- 64: Fuse (first conduction member)
- 72: Bus bar (second conduction member)

The invention claimed is:

1. An electrical connection box having a dark current circuit connection/disconnection structure includes a case for housing a dark current circuit, and a conduction member holder for holding a conduction member for conductively connecting the dark current circuit, the conduction member holder being attached to the case and movable in an insertion and removal direction of the conduction member, the conductive member being held in a manner that allows switching between a connection position conductively connected to a connection terminal of the dark current circuit housed in a cavity of the case and a disconnection position disconnected from the connection terminal, wherein, the conduction member holder includes a conduction member holding portion that extends spanning over a plurality of cavities provided in the case, the conduction member includes a first conduction member configured to be connected to the connection terminal of the dark current circuit that is housed in one of the cavities, and a second conduction member configured to be simultaneously connected to the connection terminal of the dark current circuit housed in one of the cavities and a connection terminal of another circuit that is housed in another one of the cavities, and the first conduction member or the second conduction member is selectively mounted in the conduction member holding portion according to a required circuit configuration.

2. The electrical connection box including a dark current circuit connection/disconnection structure according to claim 1, wherein, a power source is input from a battery to the dark current circuit, the first conduction member is selectively mounted if another power source is to be input to the other circuit, and the second conduction member is selectively mounted if the other power source is not to be input to the other circuit.

\* \* \* \* \*